United States Patent [19]

Linick

[11] Patent Number: 4,886,330

[45] Date of Patent: Dec. 12, 1989

[54] INFRA RED IMAGING SYSTEM

[76] Inventor: James Linick, Grand' Rue 12A, Fribourg 1700, Switzerland

[21] Appl. No.: 188,396

[22] PCT Filed: Jun. 30, 1987

[86] PCT No.: PCT/CH87/00078
§ 371 Date: Apr. 7, 1988
§ 102(e) Date: Apr. 7, 1988

[30] Foreign Application Priority Data

Aug. 7, 1986 [CH] Switzerland .................. 0347/86

[51] Int. Cl.$^4$ .................................. G02B 26/08
[52] U.S. Cl. ................................. 350/6.5; 350/486
[58] Field of Search .............. 350/6.1, 6.5, 6.6, 6.9, 350/6.91, 1.1, 486, 320, 3.71

[56] References Cited

U.S. PATENT DOCUMENTS

| 2,958,783 | 11/1960 | Taylor | 360/6.1 |
| 3,087,986 | 4/1963 | De Brosse | 358/107 |
| 3,219,822 | 11/1965 | Kutzsuher et al. | 250/347 |
| 3,917,381 | 11/1975 | Feigin | 350/294 |

FOREIGN PATENT DOCUMENTS

| 2251833 | 4/1975 | France . | |
| 0057823 | 5/1977 | Japan | 350/6.6 |
| 2071957 | 9/1981 | United Kingdom . | |
| 2166884 | 5/1986 | United Kingdom | 350/6.5 |

Primary Examiner—Bruce Y. Arnold
Assistant Examiner—Ronald M. Kalamarik
Attorney, Agent, or Firm—Dominik, Stein, Saccocio, Reese, Colitz & Van Der Wall

[57] ABSTRACT

A search apparatus and method for use in conjunction with an electro-optical sensor that does not require its own integral scanning mechanism for searching object space for potential targets. The apparatus of the invention comprises a plano mirror movable azimuthally a line perpendicular to and geometrically centered on the focal plane of the electro-optical imaging sensor and further movable about an elevational axis perpendicularly offset from the azimuthal axis of rotation and outside of the field of view of the electro-optical imaging system.

The method of the invention comprises rotating the plano mirror about its azimuthal axis of rotation while inclining (or declining) the mirror about its elevational axis of rotation to produce a spiral, substantially full hemispherical search without any corresponding movement of the electro-optical imaging sensor.

13 Claims, 4 Drawing Sheets

INFRA RED IMAGING SYSTEM

Apparatus and method for use in conjunction with an electro-optical sensor for searching and scanning hemispherical object space to find and locate potential targets.

FIELD OF THE INVENTION

This invention relates to passive and active electro-optical imaging systems for searching object space. More particularly, this invention relates to an apparatus and method for searching hemispherical volumetric object space for potential targets allowing such target information to be visually viewed and/or provided to weapons delivery systems.

DESCRIPTION OF THE BACKGROUND ART

Presently, there exist many types of imaging systems for searching object space considered to be potential targets and providing target position information to a computer for processing and then provided to a weapons delivery system to initiate and guide projectiles and/or missiles to the selected target. Such target position information may also be provided to a visual display device, such as a cathode ray tube or the like, allowing visual review of the selected target to aid the computer operator in the identification and prioritization of the selected target(s).

Many radar systems and subsystems have been developed for searching hemispherical object space, particularly ground based, vehicle mounted and ship mounted systems. Unfortunately, electro-optical systems for searching hemispherical space has been extremely limited.

More particularly, electro-optical scanning systems typically have extremely limited fields of view (FOV) on the order of two to ten degrees determined by the scanner mechanism in a forward looking Infar-Red (FLIR). The narrow field of view substantially inhibits the use of the FLIR as an electro-optical searching system to seek out and locate targets within a wide field of search.

One attempt to utilize FLIR with its incorporated scanning subsystem having narrow fields of view for searching is to mount the entire sensor onto an oscillating and rotating gimbal assembly, commonly referred to as a platform, such that the entire FLIR or other electro-optical sensor of the system is panned in an X and Y direction to search a portion of object space within a predefined field of search (FOS). However, in addition to the complexity of the platform itself, the concept of mounting a sensor onto an oscillating and rotating platform is tremendously hampered for two major reasons.

First, the mercury-cadmium-tellurium detectors commonly used in a FLIR require cryogenic cooling during operation. Cryogenic cooling sources must, because of their weight, be mounted off the platform and connected to the FLIR without interfering with the rotational and elevational movement of the platform. The difficulty of implementing such connection between the cryogenic source and the FLIR, and the multitude of electrical interfaces and the like, dramatically increases as the field of search of the platform increases. Consequently, platform-mounted electro-optical scanners usually include very limited fields of search. A second significant problem with electro-optical imaging systems, is the fact that they incorporate scanning devices in and of themselves. While staring systems (with mosaic detectors) are being developed for some wavelengths, commonly implemented scanning systems tend to, and will, smear the image, when panned azimuthally and elevationally. The quality of target detection and recognition thereby degrades while increasing the false alarm rate.

Therefore, it is an object of this invention to provide an apparatus and method which overcomes the aforementioned inadequacies of the prior art devices-and methods and provides an improvement which is a significant contribution to the advancement of the art of electro-optical and mechanical imaging systems.

Another object of this invention is to provide means for utilizing conventional and operational state of the art electro-optical components and design to search large areas of object space such as hemispherical object space.

Another object of this invention is to provide means for searching hemispherical object space with conventional electro-optical scanners in such a manner that smearing of the image is minimized, and practically eliminated allowing a better recognition and visibility of the image on a computer system, during the search.

Another object of this invention is to provide an electro-optical system including a non-rotating and non-inclining stationary electro-optical sensor thereby eliminating complex platform designs and interfaces between the sensor and the support equipment such as cryogenic coolers, computers, power supplies and the like.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

It must be known that these possible different usages or modifications of the invention stay in the field and scope of the invention of the apparatus and method for use in conjunction with an electro-optical sensor for searching and scanning the hemispherical object space to find and locate potential targets.

SUMMARY OF THE INVENTION

The invention is defined by the appended claims with a specific embodiment shown in the attached drawings. For the purpose of summarizing the invention, the invention comprises an apparatus and method for guiding the flux emitted from targets and background within object space onto a dense focal plane array located within an electro-optical sensor such as, but not limited to, a FLIR, whose spectral band width will permit observation of the flux of interest while filtering other wavelengths.

More particularly, the invention comprises a search apparatus and method for use in conjunction with various types of electro-optical imaging systems for searching hemispherical volumetric object space for potential targets allowing such target information to be visually viewed and/or provided to a weapons delivery system.

The apparatus of the invention comprises a plano mirror which is sufficiently large to encompass the staring field of view of the sensor. The plano mirror is mounted to a mechanical mechanism to cause azimuthal movement of the mirror about an azimuthal axis of rotation centered about a line perpendicular to and geometrically centered upon the focal plane of the sensor and about an elevational axis perpendicularly offset from the azimuthal axis of rotation, outside of the field of view of the sensor.

With suitable drive means operatively connected to the azimuthal and elevational axes of rotation, it should be appreciated that the azimuthal circular path of rotation of the mirror is parallel to the focal plane and that the mirror elevates about its elevational axis close to the edge of the azimuthal path of rotation and constantly parallel to the focal plane of the sensor. A timing disk is operatively connected to each axis of the mirror to provide sampling commands for sampling the scanned focal plane to establish a raster and to provide azimuthal and elevational information for coupling with the then created pixel base X and Y addresses for providing exact target position in object space and updated positional data of potential target(s) in order that a weapons system computer may establish a predictive filter(s) and thence issue fire command(s).

A mirror computer is provided for controlling the above operations to command the azimuthal motion of the mirror whether in constant 360 degree rotation or partial arc thereof and different sweep rates and to command the sweep extent rate of the elevational motion of the mirror. The mirror computer additionally accepts data and commands from the weapons system computer such as azimuthal and elevational positions of the mirror, and sampling times received and picked off from the timing disks.

Additionally, the processing of the data stream from the electro-optical focal plane could be optionally incorporated into the mirror computer.

In lieu of a plano mirror, the mirror may optionally comprise a two-sided mirror ground as a prism (wedge), the angle of which being equal to the instantaneous field of view of the focal plane. One advantage of such a two-sided mirror is that the system, using two focal planes, could view object space in a staggered format and thus utilize a dense linear array focal plane whose elements are staggered by their respective size.

The method of the invention comprises the steps of positioning a plano mirror in the manner described above and then simultaneously rotating the mirror about the azimuthal circular path of rotation while elevating or declining the mirror about the offset elevational axis. An inclining (or declining) spiral, substantially full hemispherical search is thus created. Moreover, while many hemispherical or partial hemispherical search patterns may be produced by controlling the azimuthal and elevational movement of the mirror via the mirror computer, it should also be realized that the sensor itself remains stationary irrespective of the searching pattern. Consequently, unlike the electro-optical imaging systems described above, the sensor of the system need not be mounted on a mobile platform X or Y or the like. As a result, the difficulties of interconnecting the sensor with other components of the imaging system such as the cryogenic cooler subsystem, power supplies and the like is eliminated.

Finally, since the scanning mechanism normally incorporated in the sensor is not needed and therefore may be eliminated, the smear always associated panning a simultaneously scanning electro-optical sensor is precluded. Indeed, the use of the invention's mirror for scanning also allows the sensor to be an essentially staring device.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
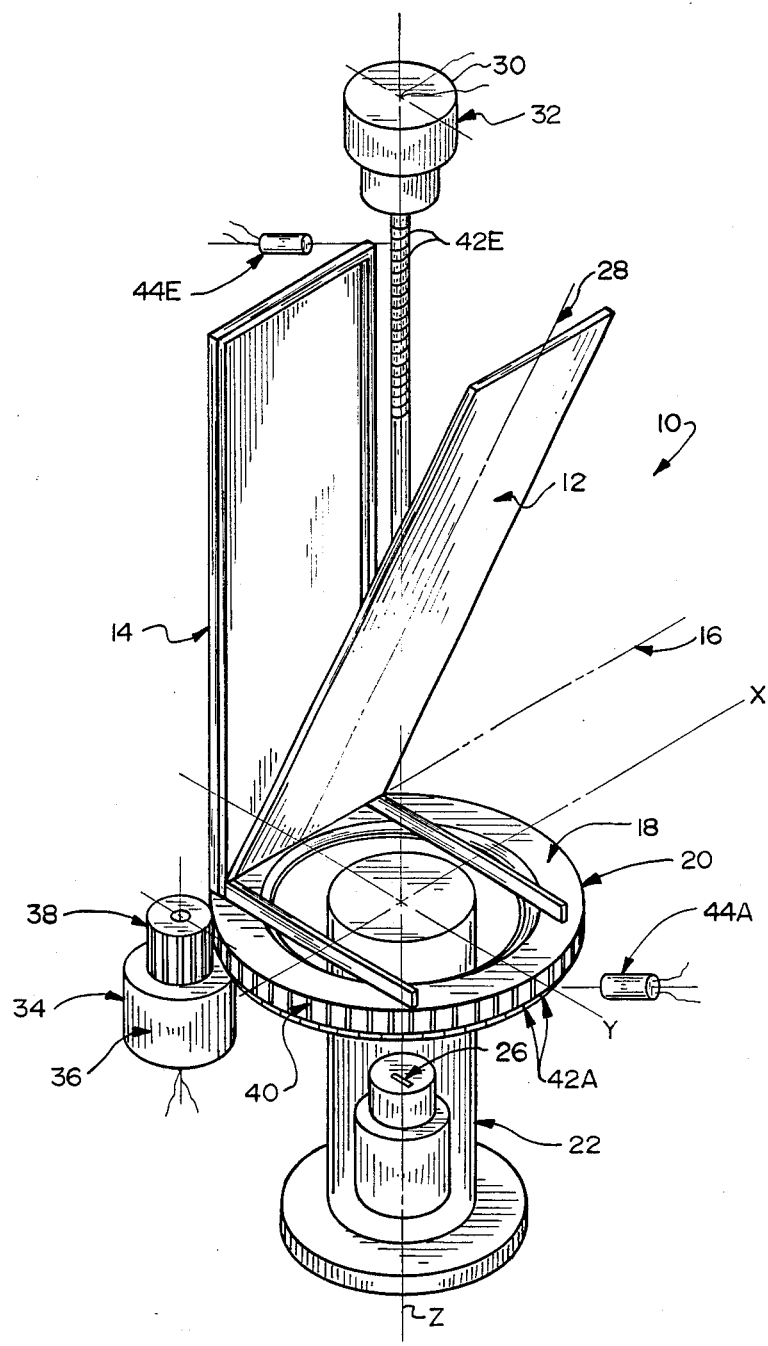
FIG. 1 is a perspective view of the basic components of the apparatus of the invention.

Referring to FIG. 1, the search apparatus 10 of the invention comprises a plano mirror 12 operatively connected within frame 14 to pivot about elevational axis 16. Frame 14 is operatively connected to annular surface 18 of a rotatable annular base 20. Annular base 20 together with frame 14 is positioned above a conventional sensor, generally indicated by numeral 22, having an objective lens system 24 for focusing incoming flux onto a detector array 26 positioned within its focal plane.

More particularly, the various components of the search apparatus 10 are positioned relative to one another in the following manner. The annular base 20 of the apparatus 10 is positioned perpendicular and centered with respect to the longitudinal axis Z of the sensor 22. Thus, the imaginary X and Y axis of the annular surface 18 thereof defines a plane of azimuthal rotation of the frame 14 and mirror 12 which is parallel to the focal plane detector array 26 and centered about the Z axis thereof. The elevational axis 16 of the plano mirror 12 pivotably mounted within frame 14 is positioned offset from the Z axis but perpendicular thereto. Further, plano mirror 12 is positioned relative to the Z axis in such a manner that its longitudinal axis 28 intersects the Z axis at all times when the plano mirror 12 pivots about its elevational axis 16.

Conceptionally, elevational drive means, generally indicated by numeral 30, is provided for pivoting the plano mirror 12 about its elevational axis 16. While many different types of elevational drive means 30 may suffice, one type of elevational drive means 30 may comprise a rectilinear drive 32 positioned colinear with the Z axis of the apparatus 10 and operatively connected to the rear of the plano mirror 12. During operation, rectilinear drive 32 functions to pivot the plano mirror 12 about its elevational axis 16.

In a similar fashion, azimuthal drive means, generally indicated by numeral 34, is operatively connected to the annular base 20 to rotate the annular base 20 with its annular surface 18 within the plane of azimuthal rotation. Without limitation, one type of azimuthal drive means 34 may comprise a rotary drive 36 having spur gear 38 rigidly affixed to its output shaft for engagement with an annular spur gear 40 rigidly affixed to the annular base 20. Thus, operation of the rotary drive 36 functions to rotate the annular base such that its annular surface 18 is rotated within the plane of azimuthal rotation which is perpendicular to the axis of azimuthal rotation and parallel the focal plane detector array 26.

A plurality of azimuthal timing marks 42A may be provided on the annular spur gear 40 or annular base 20 to be read by a photo sensor 44A to provide azimuthal position information and sampling points of the annular base 22. Similarly, a similar combination of elevational timing marks 42E and photo sensor 44E may be provided internal to the elevational drive means 30 to provide elevational position information.

Figure 2:
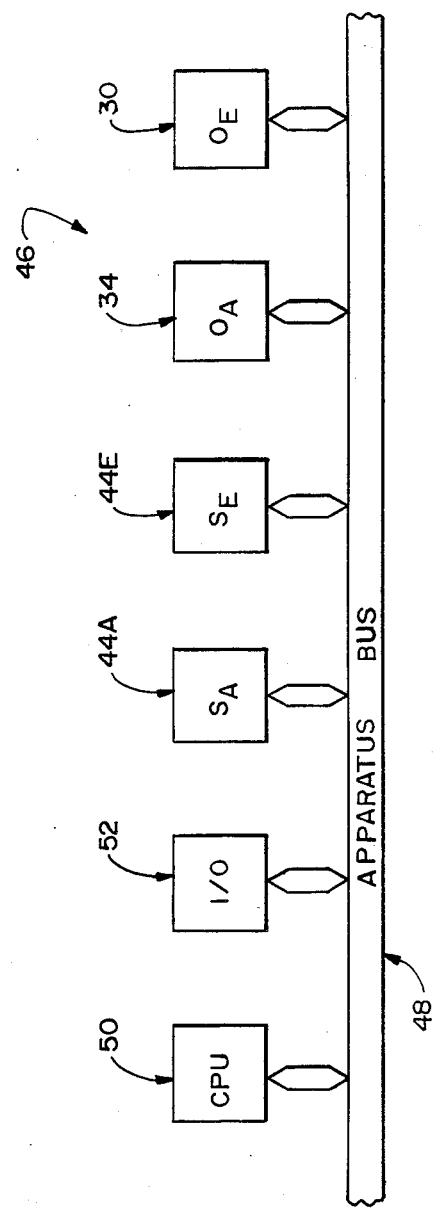
FIG. 2 is a block diagram illustrating the manner in which the mirror computer is connected to control the various components of the apparatus of the invention.

As shown in the block diagram of FIG. 2, a mirror computer, generally indicated by the numeral 46, is provided to control the operation of the search apparatus 10. Also, mirror computer 46 has an interface bus 48. The main central processing unit (CPU) 50 of the computer 46 is interfaced to the mirror bus 48 to control the operation of the elevational drive means 30 and the azimuthal drive means 34 based upon azimuthal and sampling information received from sensors 44A and 44E.

Other input and output 52 may be interfaced to the mirror bus 48 allowing the central processing unit 50 to be slaved with other control systems of the sensor 22 and/or weapon control systems.

Figure 3:
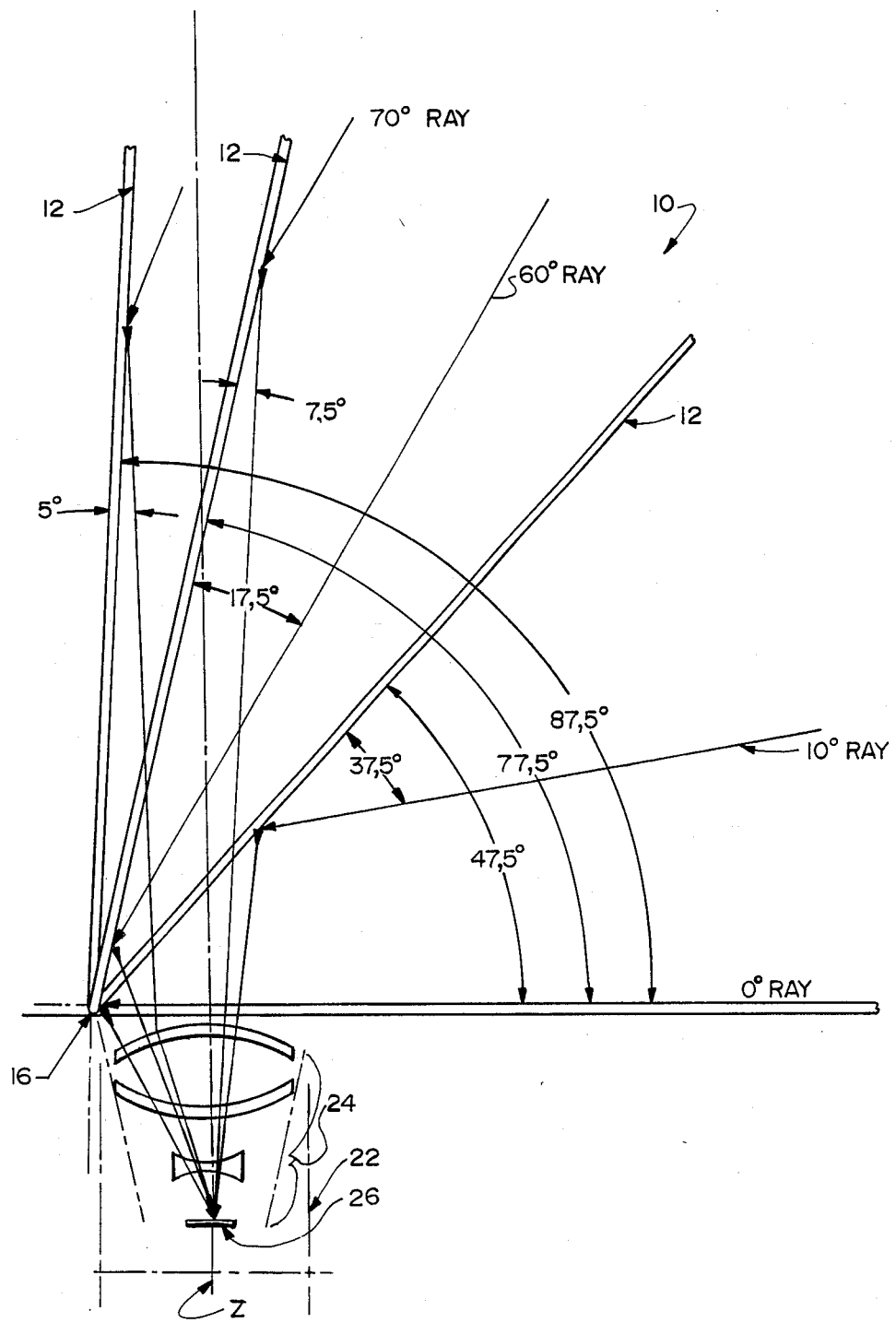
FIG. 3 is a diagrammatic view of the mirror of the invention positioned relative to an electro-optical sensor illustrating the elevational movement of the mirror and the resulting hemispherical search angles.
Figure 4:
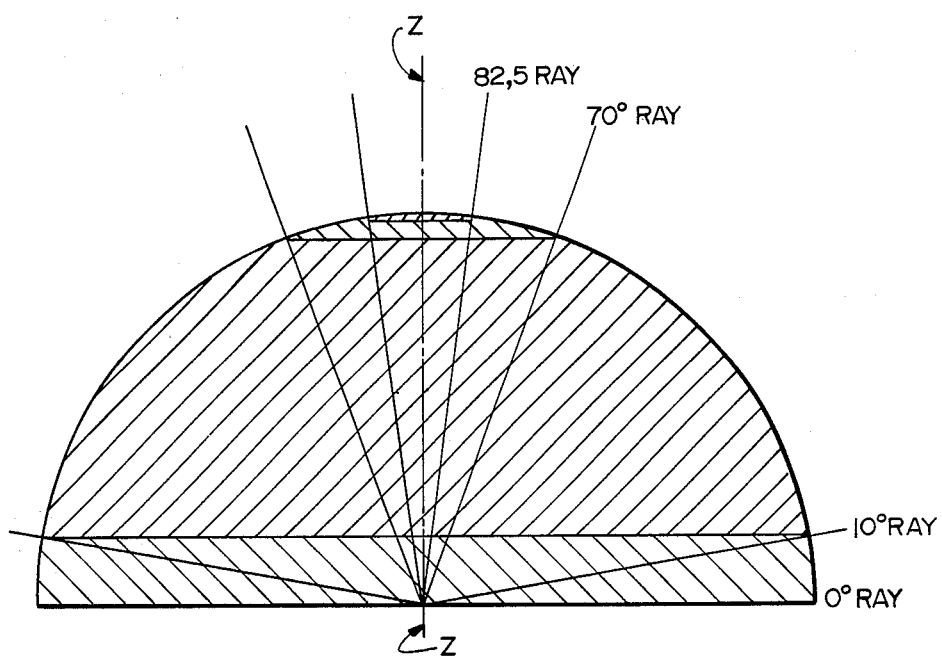
FIG. 4 is a diagrammatic view illustrating the extent of hemispherical spiral searching when simultaneously rotating and inclining the mirror about its azimuthal and elevational axis of rotation.

FIGS. 3 and 4 illustrate the searching method of the invention. More particularly, the method of the invention is best illustrated with the following specifications of an operable system. However, it must be realized that the following specifications are for illustration purposes only.

The mirror elevational position can be adjusted to view object space from horizontal to at least 70 degrees elevation, unvingeted. Assume a dense linear focal plane array of 360 elements and further assume each element size to be typically 50 microns square. The array length then equals (360)(50 microns)=18 mm. Assume an instantaneous field of view (IFOV) of 0.5 Mr. Then focal length=(element size) 50 microns/0.5 Mr (IFOV)=100 mm. Thence, the staring focal plane array field of view=(0.5 Mr) (360)=180 Mr=10.3 degrees or approximately 10 degrees.

The desired included mirror elevational angle comprises an angle that would be vertical. With the staring focal plane array being 10 degrees, it then follows that the mirror positioned to produce the extreme horizontal ray would be elevated at 47.5 degrees above horizontal. With the mirror at 47.5 degrees elevation, the staring focal plane array regards the horizon in a point in space 10 degrees above the horizon.

The invention, in order to be practical, would require utilizing a plano mirror of reasonable size, it being extremely difficult and costly to maintain flatness and surface quality over an excessively large mirror. Therefore, for the purposes of this example, the mirror length should not exceed 40 cm. The mirror width would be governed by the divergence of the staring field of view as follows:

Minimum width equals 2[(length)(tan(staring FOV))/2]=2[(40)(tan 5 degrees)]≅70 mm.

Thus, a 40 cm mirror will, with a reasonable objective lens, be in the area of 70 mm and the extreme ray diverging at 5 degrees would be unvingeted with mirror elevated to 77.5 degrees. With the mirror at 77.5 degrees elevation, the staring focal plane array regards a point in space 60 degrees above the horizon and an extreme point in space 70 degrees above the horizon.

It can be further seen that as the mirror further elevates, the focal plane will begin to be vingeted. However, we may reasonably expect that ¼ of the focal plane may be used even if the other portion has ceased receiving radiation from the mirror. Thus, it can be seen that the mirror may continue to elevate even beyond 87.5 degrees and still reflect radiation onto the staring focal plane array.

With the mirror at 87.5 degrees elevation, a vingeted portion of the staring focal plane array regards a point in space 80 degrees above the horizon in an extreme point in space 82.5 degrees above the horizon. Thus, it can be further seen and clearly demonstrated that, in a practical and readily realizable sense, the invention can regard, search and scan at least 165 degrees of hemispherical space. Thence, the mirror included angle would be 40 degrees.

Azimuthal motion is contemplated to be continuous rotary motion which may be varied by the operator.

The sampling of the lines scanned depends upon the resolution of the raster, the element size and overscan desired and each pixel observation times and sensitivity desired. This example assumes an azimuthal continuous rotary speed of 1800 rpm=30 rps. Then, $2\pi\text{rad}(30)$/sec will be scanned. With a resolution of 0.5 mrd, the scanning rate equals $377(10^3)$ pixels/sec or a dwell time ≅2.65μsec/pixel. This rate, while fast, is still within the generation and recombination rate of typical photoconductive linear infra-red dense arrays as well as other optical spectrums.

Hemispherical object space, or a part thereof, can then be searched by the mirror declining or inclining 5 degrees per 360 degrees of azimuthal motion. It then becomes apparent that, for example, 140 degrees of hemispherical scene may be searched in 8 revolutions of the mirror. This gives a complete search and an update of greater than 4 Hz.

Further, if the instantaneous field of view of the sensor(s) were, for instance, increased to 1.0 mr, then the dwell time would double and the sensitivity would increase by $\sqrt{2}$. The elevational delta angle would then be doubled. Only 4 revolutions of the mirror would search the 140 degrees of hemispherical space and the update rate would be in excess of 8 Hz.

For this example, the azimuthal and elevational speed of the mirror would be constant and precisely phased.

Mirror elevational angle rate of change equal ½ (total focal plane array staring angle) per 360 degrees azimuthal motion. Thus, with total array staring angle of 10 degrees, the elevational delta angle would be 5 degrees per 360 degrees and with an azimuthal speed of 1800 rpm, the elevational speed would be 5/360 of the azimuthal speed.

In this example, the timing marks 42A may be positioned every 32 pixels with clock reset points at every revolution to thus accommodate and correct errors caused by the mechanical friction and/or variations in drive speed. An electronic clock would linearly provide sampling or positional points between actual timing disk sensed-points.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention. It is, for instance, evident that the present invention can and will be, with some minor modifications, easily adjusted and will find a useful implementation for any airborne system such as, but not limited to, planes, missiles, satellites, observation balloons, R.P.V. And the like.

I claim:

1. A search apparatus for use in conjunction with an imaging system having a planar detector array, comprising in combination:
   a plano mirror including a reflective face
   azimuthal means for rotatably mounting said mirror in a position in front of the input to the imaging system to rotate said mirror about an azimuthal axis of rotation and in an azimuthal plane of rotation, the azimuthal plane of rotation being parallel to and centered upon the planar detector array of the imaging system; and
   elevational means for elevationally pivoting said mirror about an elevational axis offset from and perpendicular to the azimuthal axis of rotation of said mirror.

2. The search apparatus as set forth in claim 1, wherein said azimuthal rotation means comprises means for continuously rotating said mirror about said azimuthal axis of rotation.

3. The search apparatus as set forth in claim 1, wherein said elevational axis is positioned outside the field of view of the imaging system.

4. The search apparatus as set forth in claim 1, further including means for sensing the angular rotational position and speed of rotation of said mirror about said azimuthal axis of rotation.

5. The search apparatus as set forth in claim 1, further including means for sensing the elevational position and rate of inclining and declining of said mirror about said elevational axis.

6. The search apparatus as set forth in claim 1, further including computer means for controlling the operation of said rotation means and said elevation means to produce a desired search pattern of and within hemispherical object space, by controlling the direction and degree of movement of said mirror about said azimuthal axis and said elevational axis.

7. A search method used in conjunction with an imaging system having dense linear planar detectors, comprising the steps of:
   providing a plano mirror including a reflective face;
   rotatably mounting said mirror in a position in front of the input to the imaging system and rotating said mirror in an azimuthal plane of rotation parallel to and centered upon the planar detector array of the imaging system; and
   elevationally pivoting said mirror about an elevational axis offset from and perpendicular to the azimuthal axis of rotation of said mirror.

8. The search method as set forth in claim 7, wherein the step of azimuthally rotating said mirror comprises the step of continuously rotating said mirror about said azimuthal axis of rotation.

9. The search method as set forth in claim 7, wherein the step of pivoting said mirror about said elevational axis further includes the step of positioning said elevational axis outside the field of view of the imaging system.

10. The search method as set forth in claim 7, further including the step of sensing the angular rotational position and speed of rotation of said mirror about said azimuthal axis of rotation.

11. The search method as set forth in claim 7, further including the step of sensing the elevational position and rate of inclining and declining of said mirror about said elevational axis.

12. The search method as set forth in claim 7, further including the step of computer controlling the operation of said rotation means and said elevation means to produce a desired scan and search pattern by controlling the direction and degree of movement of said mirror about said azimuthal axis and said elevational axis.

13. The search method as set forth in claim 7, wherein the method of scanning and panning simultaneously the hemispherical object space using a plano mirror rotating about an azimuthal plane for creating the horizontal lines of the image and the sampling points on these horizontal lines for creating the vertical lines of the image and thus the complete raster avoiding and almost totally eliminating the offset, the overscan, the wrapping and the smearing pixel to pixel and line to line.

* * * * *